Jan. 16, 1940.  A. KINGSBURY  2,187,084
SEALING MEANS FOR SHAFTS
Filed May 19, 1937
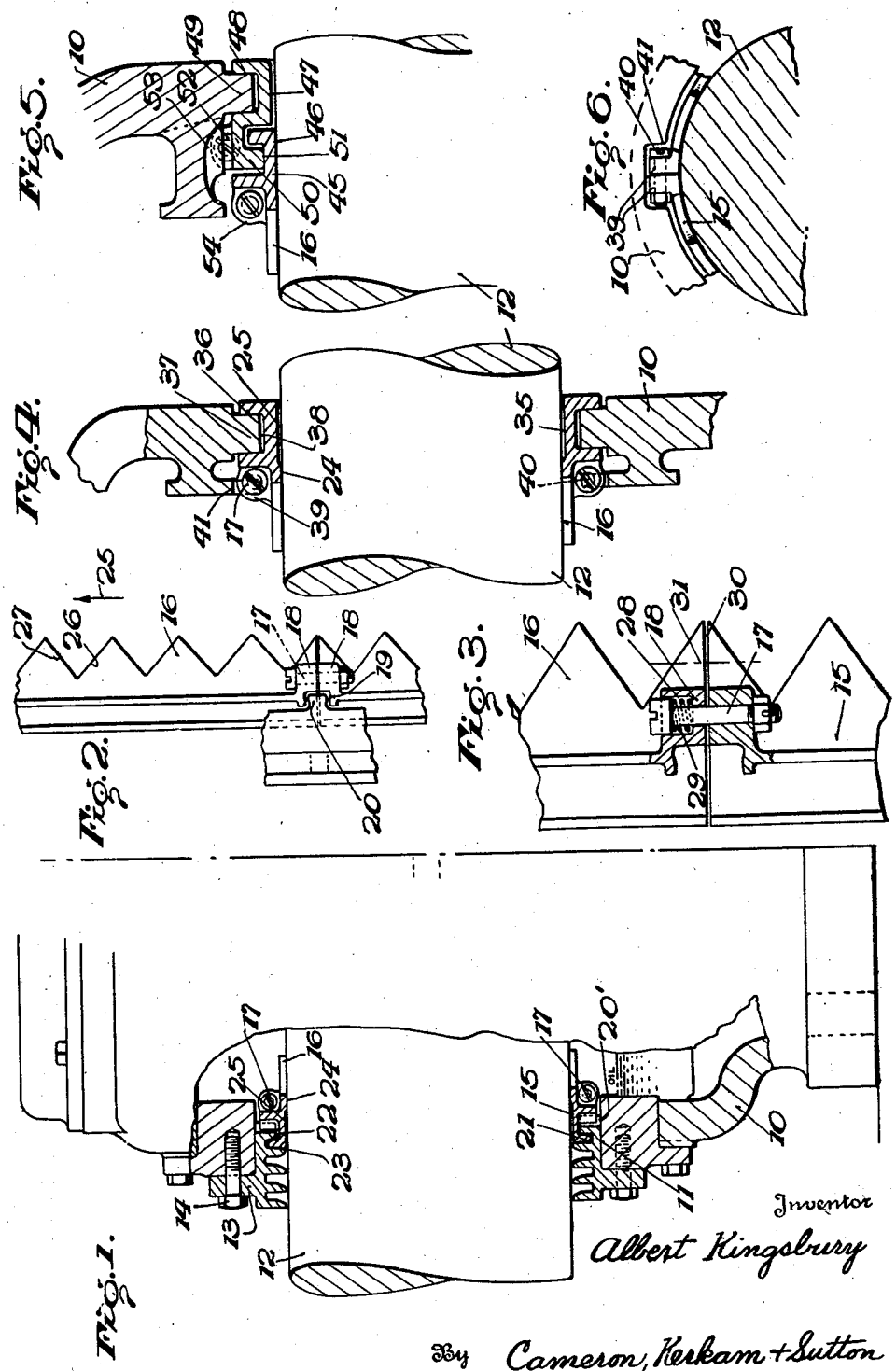
Inventor
Albert Kingsbury
By Cameron, Kerkam + Sutton
Attorneys Patented Jan. 16, 1940

2,187,084

UNITED STATES PATENT OFFICE 2,187,084

SEALING MEANS FOR SHAFTS

Albert Kingsbury, Greenwich, Conn., assignor to Kingsbury Machine Works, Inc., Philadelphia, Pa., a corporation of Delaware Application May 19, 1937, Serial No. 143,614

4 Claims. (Cl. 286—5)

This invention relates to means for preventing the flow of oil along a shaft, such for example as where it passes through a partition or the wall of a bearing housing, and more particularly to means for preventing the escape of oil that splashes or drips onto a shaft as distinguished from oil that may be under a substantial pressure or head tending to cause it to flow along the shaft.

It is common practice to seal the outlet of a housing through which a shaft extends by compressing a flexible packing ring or rings into gripping engagement with the shaft. Such packing means has the disadvantage that it eventually wears the shaft, tending to produce a groove therein where the compressed packing material engages the shaft, and moreover such compressed material rubbing on the shaft appreciably increases the friction loss. Various other forms of sealing devices such as combs, labyrinths, etc., have been suggested but have not proved entirely satisfactory for preventing escape of oil along the shaft.

It is an object of this invention to provide sealing means which does not employ compressed material in contact with the shaft, and therefore avoids the wear and loss by friction of that type of construction, and which at the same time substantially prevents all flow of oil along the shaft.

Another object of this invention is to provide a device of the type characterized which can be readily applied to existing installations as a substitute for the packing heretofore in use.

Another object of this invention is to provide a device of the type characterized which may be satisfactorily employed though previously used packing has worn the surface of the shaft.

Another object of this invention is to provide a device of the type characterized which has a relatively narrow axial contact with the shaft so that automatic alignment may be readily effected.

Another object of this invention is to provide a device of the type characterized which resiliently maintains a predetermined clearance with the shaft.

Another object of this invention is to provide a device of the type characterized which may be readily adapted to the bore of a housing through which a shaft extends in a manner that is readily machinable.

Another object of this invention is to provide a device of the type characterized which may be given an extended contact with the shaft and yet be self-aligning.

Another object of this invention is to provide a device of the type characterized which is simple in construction, easy to manufacture and readily installed.

Other objects will appear as the description of the invention proceeds.

The invention is capable of receiving a variety of mechanical expressions, some of which are shown on the accompanying drawing, but it is to be expressly understood that the drawings are for purpose of illustration only and are not to be construed as a definition of the limits of the invention, reference being had to the appended claims for that purpose.

Referring in detail to the drawing, wherein like reference characters are employed to designate like parts in the several figures, Fig. 1 is an axial section of an embodiment of the present invention;

Fig. 2 is a fragmentary developed section on an enlarged scale of the embodiment shown in Fig. 1;

Fig. 3 is a fragmentary section on a further enlarged scale illustrating another manner of securing the sealing ring in position;

Figs. 4 and 5 are fragmentary axial sections of additional embodiments of the present invention; and Fig. 6 is a fragmentary view illustrating a suitable means for preventing rotation of the sealing ring.

Referring first to Fig. 1, 10 designates a housing of any suitable character having an opening 11 through which a shaft 12 extends. To prevent the escape of oil longitudinally of said shaft some form of packing is conventionally installed in the opening 11 between the wall and the surface of the shaft. The present invention is concerned with improved sealing means which prevents the escape of oil along the shaft through this opening without wearing the shaft or materially increasing the friction losses.

In the embodiment of Fig. 1 a comb ring 13 is shown as mounted on the housing 10 at the opening 11 in any suitable way, as by bolts or screws 14, and the novel sealing means of the present invention is here illustrated as designed to be mounted on said comb ring so that it may be moved into and out of operative position, through the opening 11, as the comb ring is mounted in position or removed therefrom, although it is to be expressly understood that the invention is in no sense to be limited to such form of mounting means.

In conformity with the present invention a sealing ring 15, having a serrated edge 16 directed inwardly with respect to the opening, is floatably but non-rotatably mounted on said comb ring 13. Said ring 15 is preferably made in halves which may be secured together around the shaft by means of bolts 17 extending through apertures in opposed lugs 18. To prevent rotation of said ring 15 a projection on one of said rings 13, 15 is designed to engage in a notch in the other of said rings; thus as shown in Fig. 2 the ring 15 is provided with a notch 19 which receives a projection 20 on the comb ring 13, although the opposite arrangement of notch and projection is equally available as indicated at 20' in Fig. 1. Said ring 15 at its edge opposite the serrated edge 16 has an outwardly directed rib or flange 21 which is slidably received within a corresponding groove 22 in ring 13. Flange 21 is of less radial extent than said groove 22 so that a clearance 23 exists between the inner end of said flange and the bottom of said groove, to the end that said ring may float with respect to ring 13 and thus remain in proper relationship to the shaft 12 though exact concentricity of the shaft and housing wall does not exist.

The inner face of ring 15 has a relatively small clearance from the surface of the shaft for at least a portion of its width, preferably on the order of .001" in thickness, and also, as here shown, this area of small clearance is provided at an axially narrow area at the base of the serrations 16 as indicated at 24, the ring being bored to a larger diameter as indicated at 25 and shown more clearly in the enlarged view of Fig. 4 except for the axially narrow zone of bearing engagement adjacent the serrated edge 16. Hence ring 15 may not only float to follow the shaft by reason of its mounting 21, 22, but it may also tilt somewhat on the axially narrow area 24 so as to maintain proper alignment with the shaft.

Assuming that the shaft is rotating in the direction of the arrow 25 in Fig. 2, and remembering that the ring 15 is stationary, any oil tending to creep along the shaft toward the opening 11 will enter one of the notches, as for example that designated 26 in Fig. 2, but it will be dragged by the shaft toward and collect on the side 27 of said notch, at the same time having imparted thereto a motion which results from the rotary action of the shaft thereon. Hence, depending on the inclination of said side 27, the oil moved thereagainst will be given a diagonal movement toward the tip of the tooth, rather than be merely dammed up by the edge of the tooth as would be the case if its edge were axially directed, and by properly selecting the angle between the edges of the teeth this movement can be made such as to assure that the oil entering any notch between a pair of teeth will have imparted thereto an average velocity, inwardly with respect to the aperture, that will assure its flowing away from the aperture and thus prevent escape along the shaft. While this angle can be varied within substantial limits, depending upon the R. P. M. of the shaft, its diameter, etc., experience has demonstrated that an angle of approximately 45° gives the desired results for average installations.

Not only is the oil caused to flow diagonally inwardly by the action of the inclined edge 27 thereon, but this inwardly directed flow appears to assist in preventing escape of oil through the radially narrow clearance at the bearing portion 24 which, as above indicated, is on the order of .001" in thickness. Apparently the cohesiveness of the oil causes the oil deflected inwardly by the edge 27 to exert a pull on the film at 24 so that the oil in said film tends to move inwardly rather than outwardly with respect to the shaft.

If preferred the ring 15 may be resiliently urged to maintain the predetermined clearance with the shaft. To this end, as shown in Fig. 3, the bolt 17 may have resilient means cooperating therewith tending to reduce the diameter of the ring. As here shown, one of the lugs 18 is recessed as shown at 28 and a coil spring 29 reacts between the bottom of said recess and the head of the bolt 17 so as to tend to decrease the gap 30 between the meeting sections of the ring. This provision may be employed at both meeting portions of the subdivided ring, but inasmuch as the ring is possessed of some resiliency it is ordinarily sufficient to provide the resilient provision of Fig. 3 at one side only on the shaft, in which case the gap between the meeting sections of the ring, such as 30 in Fig. 3, should be disposed at the underside of the shaft so as to minimize likelihood of oil escaping through said gap.

While the joint between the ring halves may be formed at any suitable place, it is shown as disposed at the widest point of the ring, i. e., so as to intersect the apex of a tooth, and where such location is employed the end of the subdivided tooth may be cut away at approximately the position indicated by the dot and dash line 31.

Where the sealing ring of the present invention is used in conjunction with an installation wherein a previously used packing has worn the surface of the shaft, the bearing portion 24 should be so disposed as to cooperate with an unworn surface of the shaft. As will be apparent from Fig. 1 the construction here illustrated is adapted to dispose the bearing portion 24 inwardly of that portion of the shaft that is likely to have become worn as a result of the action of compressed packing material engaging the surface of the shaft.

In place of mounting the ring 15 on a comb ring said ring may be mounted in any other suitable way, as, for example, directly on the housing as shown in Fig. 4. In this embodiment the ring 35 has a groove 36 at its rear which receives an annular projection 37 that can be readily and conveniently machined on the housing. As in the embodiment of Fig. 1 a clearance 38 is left between the periphery of said projection 37 and the bottom of the groove 36 so that said ring may float with the shaft and, as in the embodiment of Fig. 1, said ring has an axially narrow bearing contact 24 with the surface of the shaft. In this embodiment the ring is subdivided at diametrically opposite portions thereof and provided with lugs 39 which are held together by bolts or screws 40, and if desired the resilient provision of Fig. 3 may be incorporated. As here shown (compare Figs. 4 and 6) one or more notches 41 are provided at any suitable location on the housing wall to receive the lugs 39 whereby the ring is prevented from rotating with the shaft.

If a longer bearing engagement of the ring with the shaft is desired, or if a larger self-aligning movement of said ring is wanted, the construction shown in Fig. 5 may be employed. As here illustrated the ring 45, which may be of the same construction as shown in Fig. 1 except that it has an axially longer surface 46 in bearing contact with the periphery of the shaft, is mounted on an S-shaped ring 47 which has floating engagement at 48 with an annular projection 49 on the housing, said ring 47 having an inwardly directed flange 50 which cooperates with a groove 51 in the ring 45 to hold the latter in position. Flange 50 and groove 51 may be formed in any suitable way to prevent relative rotation therebetween, and ring 47 may be held against rotation with respect to the housing in any suitable way as by the engagement of the lugs 52, by which the halves of the ring 47 are secured together, in one or more notches 53 suitably formed in the housing. Ring 45 is preferably made in halves as indicated at 54, and the resilient provision of Fig. 3 may be included if desired.

It will therefore be perceived that by the present invention a sealing ring has been provided which assures against escape of oil along the shaft without materially adding to the friction of the shaft or tending to wear the surface of the shaft. Said ring may be readily applied to installations already in use as well as applied to new installations, it may be used with installations wherein the shaft has already been worn as the result of the packing previously used, and the construction is such that the ring not only floats with the shaft but also may be given the desired self-aligning movement to maintain proper cooperation with the shaft. The ring may be readily assembled with respect to the shaft with the halves thereof secured around the same, and if desired the construction may include means for resiliently maintaining the clearance between the ring and the shaft at a predetermined minimum. Moreover, the construction is simple, devices embodying the same are easily fabricated and assembled, and experience has demonstrated that the construction employed is highly efficient in preventing escape of oil particularly where leakage is due to oil spattering or dripping onto the shaft.

While the embodiments of the invention illustrated on the drawing have been described with considerable particularity, it is to be expressly understood that the invention is not restricted thereto, as the same is capable of receiving a variety of mechanical expressions only some of which are illustrated on the accompanying drawing, and therefore it is to be expressly understood that changes may be made in the details of construction, arrangement and proportion of parts, and certain features used without other features, without departing from the spirit of this invention so long as the principle disclosed is employed. Reference is therefore to be had to the appended claims for a definition of said invention.

What is claimed is:

1. In a sealing means for a shaft, a stationary ring adapted to have small clearance with the periphery of the shaft and having at its inner periphery inwardly directed serrations the edges of which tend to deflect oil engaging the same inwardly with respect to the shaft opening, said ring being made in halves adapted to be secured together around the shaft, and a spring coacting with the ends of said ring for resiliently urging said halves into a form wherein said ring maintains a small predetermined clearance between its inner surface and the surface of said shaft.

2. In a sealing means for a shaft extending through an opening in a housing, a stationary ring adapted to have small clearance with the periphery of the shaft and having at its inner periphery inwardly directed serrations the edges of which tend to deflect oil engaging the same inwardly with respect to the shaft opening, said ring having a smaller outside diameter than the shaft opening, and a second ring having a rib and groove connection to said first named ring and attached to the housing at said opening exteriorly thereof whereby said first named ring may be moved as a unit with said second named ring into and out of said opening.

3. In a sealing means for a shaft extending through an opening in a housing, a stationary ring adapted to have small clearance with the periphery of the shaft and having at its inner periphery inwardly directed serrations the edges of which tend to deflect oil engaging the same inwardly with respect to the shaft opening, and a second ring mounted in said opening in the housing and having radial clearance therefrom to float with respect thereto, said second ring engaging said first named ring to maintain the same in operative position.

4. In a sealing means for a shaft, a stationary ring adapted to be mounted in an aperture through which the shaft extends and providing a relatively small clearance between said ring and the surface of said shaft, said ring having at its inner periphery inwardly directed edges which are inclined with respect to the axis of the shaft so that oil on the shaft surface engaging said inwardly inclined edges will have imparted thereto a velocity which causes said oil to flow away from said ring and inwardly with respect to said opening, and means mounting said ring at said aperture and providing a rib and groove connection with said ring, said rib having a radial clearance from the bottom of said groove so that said ring may float with the shaft and said rib cooperating with said groove to maintain the ring axially in operative position.

ALBERT KINGSBURY.